(12) United States Patent
Paul et al.

(10) Patent No.: US 6,598,749 B2
(45) Date of Patent: Jul. 29, 2003

(54) SPIRAL PLEATED FILTER CARTRIDGES

(75) Inventors: C. Thomas Paul, Madison, CT (US); Scott D. Wofsy, Wilton, CT (US)

(73) Assignee: CUNO Incorporated, Meriden, CT (US)

( * ) Notice: Subject to any disclaimer, the term of this patent is extended or adjusted under 35 U.S.C. 154(b) by 71 days.

(21) Appl. No.: 09/950,861

(22) Filed: Sep. 12, 2001

(65) Prior Publication Data

US 2002/0060183 A1 May 23, 2002

Related U.S. Application Data (60) Provisional application No. 60/233,327, filed on Sep. 15, 2000.

(51) Int. Cl.[7] .............................................. B01D 27/06
(52) U.S. Cl. ..................... 210/457; 210/485; 210/489; 210/493.1; 210/493.4; 210/493.5; 210/497.01
(58) Field of Search ....................... 210/321.77, 321.86, 210/457, 458, 485, 493.1, 493.4, 493.5, 497.01, 497.1, 497.2, 487, 489; 55/521

(56) References Cited

U.S. PATENT DOCUMENTS

| | | |
|---|---|---|
| 2,395,449 A | 2/1946 | Briggs |
| 2,401,222 A | 5/1946 | Briggs |
| 2,420,414 A | 5/1947 | Briggs |
| 2,537,992 A | 1/1951 | Gross et al. |
| 2,586,078 A | 2/1952 | O'Malley |
| 2,627,350 A | 2/1953 | Wicks |
| 2,689,652 A | 9/1954 | Gretzinger |
| 2,801,009 A | 7/1957 | Bowers |
| 3,022,861 A * | 2/1962 | Harms ......................... 55/521 |
| 3,386,583 A | 6/1968 | Merten |
| 3,692,184 A | 9/1972 | Miller, Jr. et al. |
| 3,799,354 A | 3/1974 | Buckman et al. |
| 4,033,881 A | 7/1977 | Pall |
| 4,154,688 A | 5/1979 | Pall |
| 4,673,503 A | 6/1987 | Fujimoto |
| 5,174,896 A | 12/1992 | Harms, II |
| 5,320,657 A | 6/1994 | Adams ......................... 55/463 |
| 5,403,482 A | 4/1995 | Steere et al. |
| 5,472,606 A | 12/1995 | Steere et al. |
| 5,543,047 A | 8/1996 | Stoyell et al. |
| 5,591,338 A | 1/1997 | Pruette et al. |
| 5,690,765 A | 11/1997 | Stoyell et al. |
| 5,725,784 A | 3/1998 | Geibel et al. |
| 5,882,288 A | 3/1999 | Paul et al. |
| 6,315,130 B1 | 11/2001 | Olsen |

FOREIGN PATENT DOCUMENTS

| | | |
|---|---|---|
| CA | 527620 | 7/1956 |
| CA | 649680 | 10/1962 |
| DE | 39 35 503 | 5/1991 |
| GB | 480810 | 3/1938 |
| GB | 764254 | 12/1956 |
| GB | 823648 | 11/1959 |
| GB | 1 400 147 | 7/1975 |
| JP | 60-61017 | 4/1985 |
| JP | 60-125220 | 7/1985 |
| RU | 2108845 | 4/1998 |
| SU | 1255165 | 9/1986 |
| SU | 1761201 | 9/1992 |
| WO | WO 00 40319 A | 7/2000 |

OTHER PUBLICATIONS

International Search Report dated May 28, 2002. for PCT/US01/28394.

(List continued on next page.)

*Primary Examiner*—Matthew O. Savage
(74) *Attorney, Agent, or Firm*—Scott D. Wofsy; Edwards & Angell, LLP (57) ABSTRACT

A filter is disclosed that includes a cylindrical filter element having a longitudinal axis, an outer periphery, an inner periphery, and a plurality of longitudinal pleats arranged in a spiral configuration in close proximity to one another. Each of the pleats has a pair of legs, and the legs of each pleat are joined to one another at a root. The roots of adjacent pleats are radially spaced from one another about the inner periphery of the filter element.

29 Claims, 6 Drawing Sheets

OTHER PUBLICATIONS

Meltzer and Jornitz Eds., *Filtration in the Biopharmaceutical Industry*, Marcel Dekker, Inc., Soelkner and Rupp, *Cartridge Filters*, Sartorius AG, Göttingen, Germany, pp. 145–168, date unknown.

Chandler Worldwide Group, Inc. *Overlap Pleater*, Mar./Apr. 1993.

Pall Corporation, *Pall Septra™ Backwash Filter Systems—Automated Filtration Systems Technology*, 1986 (product brochure).

Cuno Incorporated, *MaxMedia™ Construction for Extra Long Life*, 1997 (product brochure).

Pall Corporation, *Ultipleat High Flow Filter Systems Designed for Large Flow Applications with Efficiency, Economy and the Environment in Mind*, 1997 (product brochure).

Clariflow Select website, PTI Advanced Filtration Inc., printed Aug. 15, 2001.

* cited by examiner

SPIRAL PLEATED FILTER CARTRIDGES

CROSS-REFERENCE TO RELATED APPLICATION

The subject application claims the benefit of priority from U.S. Provisional Patent Application Ser. No. 60/233,327 filed Sep. 15, 2000, the disclosure of which is incorporated herein in its entirety.

BACKGROUND OF THE INVENTION

1. Field of the Invention

The subject invention is related to fluid filtration devices, and more particularly, to spiral pleated filters having unique pleat configurations that develop lower pressure drops than conventional spiral pleated filters.

2. Background of the Related Art

Over the years, the design of cylindrical pleated filter cartridges has involved efforts to maximize the amount of filter media or surface area that may be fit into a filter cartridge having a given outer diameter without adversely effecting flow or filter life. In a standard radially pleated filter cartridge such as that which is disclosed in U.S. Pat. No. 3,692,184, the amount of filter media that may be packed into the cartridge is limited by the number of pleats that can be packed about the cartridge core. Consequently, there is a substantial amount of empty space between adjacent pleats at the outer periphery of the filter element.

A cylindrical filter element having a radially extending W-pleat configuration, such as that which is disclosed in U.S. Pat. No. 3,799,354 represents an improvement over a standard radially pleated filter element. The radial W-pleat configuration provides added surface area about the outer periphery of the filter element by providing relatively short pleats that extend radially inward from the outer periphery of the filter element between adjacent pleats of standard height. These shorter pleats occupy the open space near the outer periphery of the filter element. They do not, however, maximize the amount of filter media that can be disposed within the cartridge, as some empty space still remains between the pleats. The radial W-pleat construction also suffers from the effect of pleat migration, in that the shortened pleats tend to move radially inward towards the central axis of the filter. This movement is undesirable as it can cause binding, blockages, increased pressure drops across the filter, reduced filter life and can damage the filter media.

A spiral pleated filter element is comparable to a standard radially pleated filter element in that it includes a plurality of longitudinal pleats disposed in a cylindrical configuration. In a spiral pleated filter, however, the ends of the pleats are rolled over to minimize the spacing between adjacent pleat surfaces near an outer diameter of the filter element. In this case, the pleat height is substantially greater than the distance between the outer periphery of the cartridge core and the inner periphery of the cartridge cage. Consequently, in a conventional spiral pleated filter, the pleats at the outer periphery occupy the excess volume that would normally represent empty space in a radially pleated filter element.

While both the spiral pleat and the radial W-pleat designs provide increased filter surface area as compared to a standard radial pleat configuration, the spiral pleat configuration does not have the pleat migration problems associated with the radial W-pleat configuration. As compared with a radial W-pleat filter, however, the rolled-over pleats of a spiral pleated filter provide fewer and less accessible radial flow paths near the outer diameter of the filter. These factors lead to a greater pressure drop across the filter. In addition, the rolled-over pleats of a spiral pleated filter provide longer flow paths and, therefore, a greater likelihood that the flow paths will become blocked in high load or large particle contaminant applications. This condition is often referred to as bridging, and can have an adverse effect on filter life.

It has also been found that conventional spiral pleated filter elements are more difficult to insert into a cylindrical cage than standard radially pleated filter elements, because the rolled-over pleats have a tendency to straighten out prior to being inserted into the cage. As a result, the filter element can experience frictional drag along the interior surface of the cage. This can cause damage to the filter media and can, as a practical matter, limit the axial length of a filter cartridge incorporating a spiral pleated filter element.

An example of a conventional spiral pleated filter element is disclosed in U.S. Pat. No. 5,543,047 to Stoyell et al., the disclosure of which is herein incorporated by reference in its entirety. The spiral pleated filter element of Stoyell et al. comprises a three-layer composite of a filter medium, an upstream drainage layer disposed on the upstream surface of the filter medium, and a downstream drainage layer disposed on the downstream surface of the filter medium. The pleats of the filter element are dimensioned and configured in such a manner so that virtually all of the volume between the inner and outer peripheries of the filter element is occupied by the pleats. Consequently, there tends to be a high degree of pleat compaction and density at the inner periphery of the filter element, i e. at the roots of the pleats. This causes a significantly high pressure drop near the core of the filter.

In particular, the pleats of the Stoyell et al. filter element are configured such that each pleat leg abuts an adjacent pleat leg along the inner periphery of the filter element and the height of each pleat, measured in a direction along the legs and extending from the inner periphery at the root of the pleat to the outer periphery at the crown of the pleat, is greater than $(D-d)/2$ and less than $(D^2-d^2)/[4(d+2t)]$, where D and d are the outer diameter and inner diameter of the filter element at the outer periphery and inner periphery, respectively, and t is the thickness of each pleat leg. By dimensioning the pleats in this manner, the opposing surfaces of the pleats contact one another over substantially the entire height and axial length of the pleat legs, leaving substantially no empty space between adjacent pleats, and particularly in the region of the core. Indeed, the only space remaining at the core, are small triangular gaps that are located between adjacent pleat roots. Consequently, there is a relatively high pressure drop through the filter element.

Accordingly, there is a need in the art to provide a spiral pleated filter design that maximizes the surface area of the filter media while having a lower pressure drop across the filter element than prior art spiral pleated filter elements, and which is easier to insert into a supporting cage than prior art spiral pleated filter elements.

SUMMARY OF THE INVENTION

The subject invention is directed to a new and unique spiral pleated filter that includes a cylindrical filter element having a longitudinal axis, an outer periphery, an inner periphery and a plurality of longitudinal pleats that are disposed in close proximity to one another. Each of the pleats has a pair of legs, and each of the legs has a height. In accordance with the subject invention, the height of a first leg of a first pleat is greater than the radial distance between the outer periphery of the filter element and the inner periphery of the filter element, and is also greater than the height of an adjoining leg of an adjacent pleat.

It is envisioned that the height of the adjoining leg of the adjacent pleat ranges from about fifty percent (50%) of the height of the first leg of the first pleat to about ninety-five percent (95%) of the height of the first leg of the first pleat. Preferably, the filter element is a composite having plural layers of material including an upstream drainage layer, at least one interior filtration layer, and a downstream drainage layer. A perforated cage surrounds the outer periphery of the filter element, and a perforated core is surrounded by the inner periphery of the filter element.

It is envisioned that the pleats can be configured in several different ways. For example, the height of a second leg of the first pleat may be equal to the height of the first leg of the first pleat. Alternatively, the height of a second leg of the first pleat can be less than the height of the first leg of the first pleat, or the legs of the adjacent pleat can be equal in height. It is also envisioned that the height of a second leg of the adjacent pleat may be greater than the height of the other leg of the adjacent pleat.

The subject invention is also directed to a filter that includes a cylindrical filter element having a plurality of longitudinal pleats arranged in a spiral configuration in close proximity to one another. Each of the pleats has a pair of legs, and the legs of each pleat are joined to one another at a root. In accordance with the subject invention, the roots of adjacent pleats are radially spaced from one another about the inner periphery of the filter element. Also, the adjoining legs of adjacent pleats are connected to one another at a crest, and in an embodiment of the subject invention, the crests of adjacent pleats are radially spaced from one another about the outer periphery of the filter element.

The subject invention is also directed to a filter cartridge that includes a cylindrical filter element having a longitudinal axis, an outer periphery, an inner periphery, and a plurality of longitudinal pleats arranged in a spiral configuration in close proximity to one another. Each of the pleats has a pair of legs, and the legs of each pleat are joined to one another at a root. A perforated cage or netting surrounds the outer periphery of the filter element, and a perforated core is surrounded by the inner periphery of the filter element. In accordance with the subject invention, the roots of alternating pleats abut the perforated core. Also, adjoining legs of adjacent pleats are connected to one another at a crest, and in an embodiment of the subject invention, alternating crests abut the perforated cage.

These and other aspects of the subject invention will become more readily apparent to those having ordinary skill in the art from the following detailed description of the invention taken in conjunction with the drawings described hereinbelow.

BRIEF DESCRIPTION OF THE DRAWINGS

So that those having ordinary skill in the art to which the subject invention appertains will more readily understand how to make and use the filter cartridges of the subject invention, preferred embodiments thereof will be described in detail hereinbelow with reference to the drawings, wherein.

DETAILED DESCRIPTION OF PREFERRED EMBODIMENTS

Figure 1:
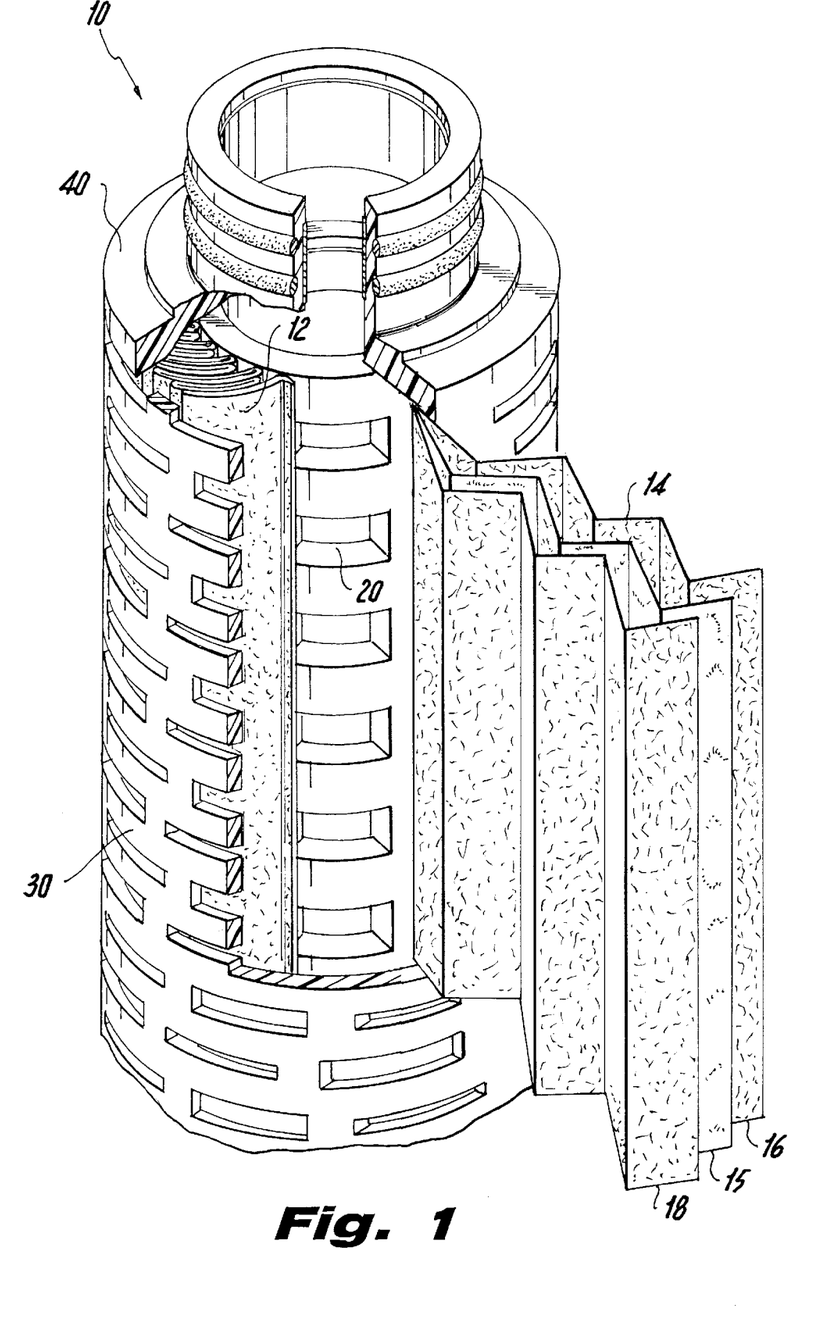
FIG. 1 is a perspective view, in partial cross-section, of a pleated filter cartridge constructed in accordance with a preferred embodiment of the subject invention which includes a spiral w-pleated filter element surrounding a perforated core and enclosed within a perforated cage.

Referring now to the drawings wherein like reference numeral identify similar structural elements and/or features of the subject invention, there is illustrated in FIG. 1 a spiral pleated filter cartridge constructed in accordance with a preferred embodiment of the subject invention and designated generally by reference numeral 10.

Referring to FIG. 1, the filter cartridge 10 of the subject invention includes an elongated spiral w-pleated composite filter element 12 having a plurality of longitudinal pleats 14 surrounding a central perforated core 20 and enclosed within a perforated outer cage 30. The core 20 supports the inner periphery of the filter element 10 against forces in the radial direction and also helps to give the filter axial strength and rigidity against bending. The cage 30 retains the pleats of the filter element 10 in a spiral configuration. It is envisioned that means other that the cage 30 may be provided to retain the pleats. For example, a polymeric netting or mesh material may be utilized to retain the pleats about the outer periphery of the filter element. End caps 40 are operatively associated with the upper and lower ends of the cartridge element and can be open (as shown) or closed depending upon the filtration application in which filter cartridge 10 is employed.

Figure 4:
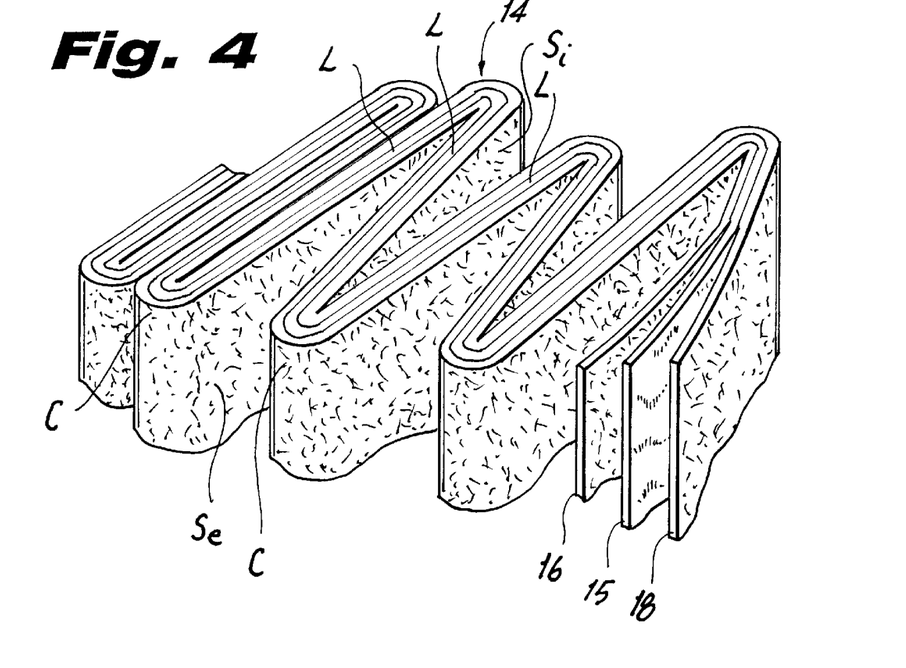
FIG. 4 is a perspective view of a portion of a pleat pack used in the formation of the filter cartridge of FIGS. 1 and 2, illustrating the multi-layer composite structure of the pleat pack, which includes, for example, a filter media layer disposed between upstream and downstream non-woven drainage layers.

Referring to FIG. 4, each longitudinal pleat 14 in the elongated filter element 12 has a pair of pleat legs L that are joined to one another at a pleat root R which is located at or near the inner periphery of the filter element, and each pleat leg is also joined to an adjoining leg of an adjacent pleat at a pleat crest or crown C which is located at or near the outer periphery of the filter element. Each pleat has a height corresponding to the radial extent of the pleat, and a pleat length corresponding to the axial extent of the pleat. As will be discussed in greater detail hereinbelow, in embodiments of the spiral pleated filter element of subject invention, the pleat heights are not uniform throughout the filter element. As a result, the flow characteristics of the cartridge are improved relative to conventional spiral pleated filter cartridges wherein all of the pleats are equal in height and tightly packed within the cartridge. In addition, because the heights of the pleats are not uniform throughout the filter element, it has been found that the filter element of the subject invention can be axially inserted into a supporting cage with relative ease, and without frictionally dragging the pleat crowns against the interior surface of the cage. Consequently, the filter media will not be damaged during cartridge assembly.

With continuing reference to FIG. 4, each pleat leg has an internal surface $S_i$ which opposes the internal surface $S_i$ of the other leg in the same pleat and an external surface $S_e$ which opposes the external surface $S_e$ of an adjoining leg of an adjacent pleat. When the filter element 10 is being used such that fluid flows radially inwardly though the filter element, i.e., from the cage 30 to the core 20, the internal surfaces of the pleat legs form the downstream surface of the filter element 12, while the external surfaces of the pleat legs form the upstream surface of the filter element 12. Conversely, when the filter element 12 is being used such that fluid flows radially outwardly through the element, i.e., from the core to the cage, the internal surfaces of the pleat legs define the upstream surface of the filter element 12 and the external surfaces of the pleat legs define the downstream surface of the filter element 12. In either configuration of the filter element 12, adjacent pleat surfaces of adjoining pleat legs are in mutually supporting contact with one another over their respective heights.

Figure 3:
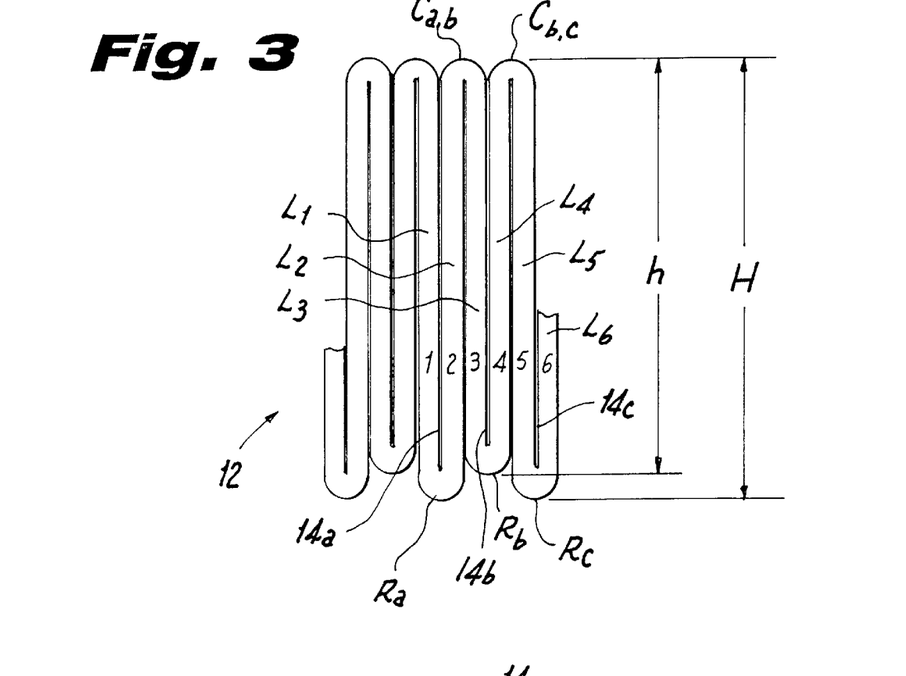
FIG. 3 is a plan view of a portion of a pleat pack used in the formation of the filter cartridge of FIGS. 1 and 2, illustrating the relative heights of the alternating pleats.

Referring to FIG. 3, in filter element 12, adjacent pleats have different pleat heights. More particularly, a first pleat 14a has pleat legs $L_1$ and $L_2$ which are equal in height and share a common root $R_a$. A second pleat 14b has pleat legs $L_3$ and $L_4$ that are equal in height and share a common root $R_b$. Pleat leg $L_2$ of pleat 14a is joined to pleat leg $L_3$ of pleat 14b at pleat crest $C_{a,b}$. The height of pleat legs $L_3$ and $L_4$ is less than the height of pleat legs $L_1$ and $L_2$. Similarly, pleat 14c has pleat legs $L_5$ and $L_6$, where pleat leg $L_5$ is joined to pleat leg $L_4$ of pleat 14b at a pleat crest $C_{b,c}$, and pleat legs $L_5$ and $L_6$ share a common root $R_c$.

Figure 2:
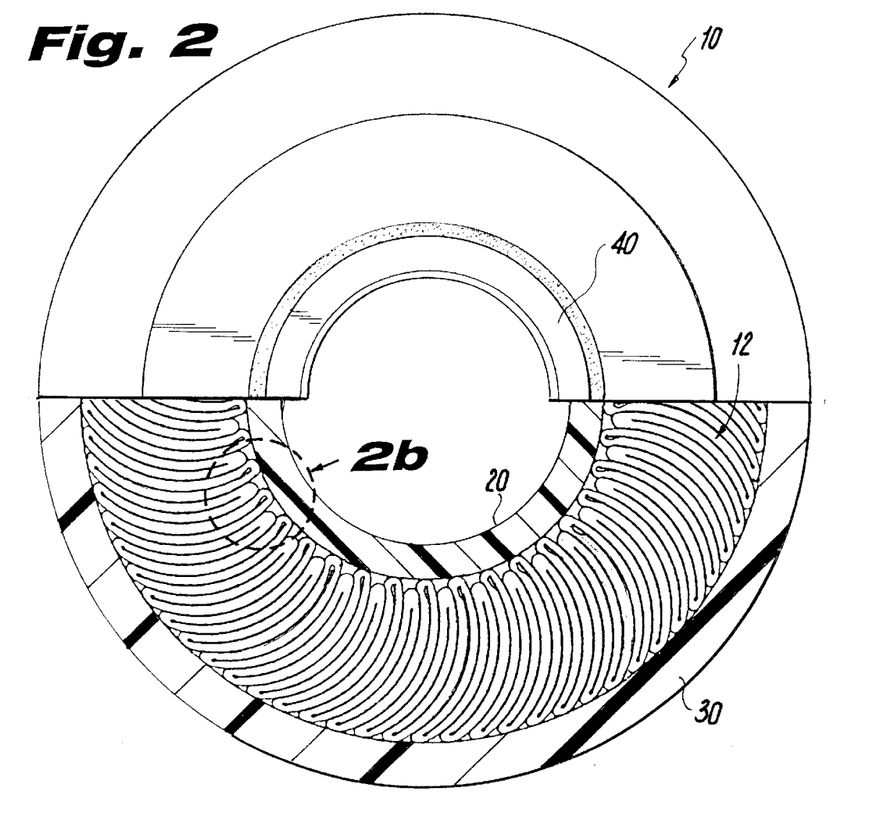
FIG. 2 is a cross-sectional view of the spiral w-pleated filter cartridge of FIG. 1 illustrating the unique pleat configuration thereof, wherein the pleat heights are staggered about the inner periphery of the filter element at a uniform frequency.
Figure 2A:
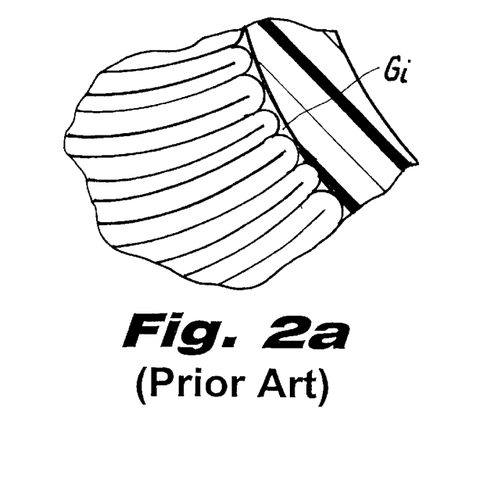
FIG. 2a is a view similar to FIG. 2b illustrating the configuration of the pleats of a conventional spiral pleated filter element wherein the roots of adjacent pleats are tightly packed about the core of the filter cartridge.
Figure 2B:
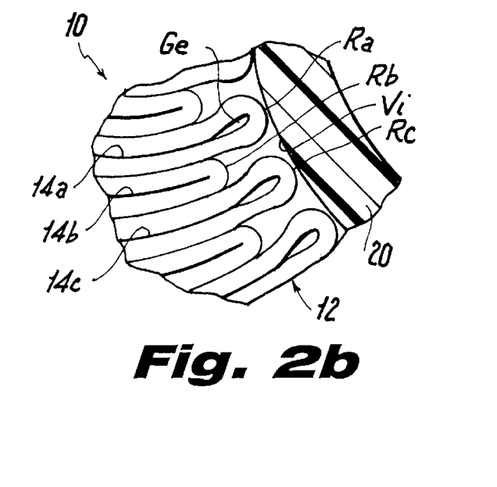
FIG. 2b is an enlarged localized view of the spiral w-pleated filter cartridge of FIG. 2, illustrating the spaced relationship of adjacent pleat roots at the core of the filter cartridge.

As illustrated in FIG. 2b, pleat roots $R_a$ and $R_c$ of pleats 14a and 14c, respectively, contact the core 20 of filter cartridge 10 at the inner periphery of filter element 12, while the pleat root $R_b$ of pleat 14b is spaced from the inner periphery of filter element 12 a sufficient radial distance so as to create a void space $V_i$ at the core of the filter cartridge that extends along the entire length of filter element 12, preventing adjacent pleat surfaces from contacting one another over a substantial portion of the height of the pleats. This void space is repeated in a uniform manner about the entire inner periphery of filter element 12, as best seen in FIG. 2. As a result, a plurality of longitudinally extending channels are defined along the inner periphery of filter element 12. These longitudinal channels enhance drainage through the perforated core of the filter cartridge. Consequently, the differential pressure drop across filter element 10 is less than the differential pressure drop across a conventional spiral pleated filter element wherein all of the pleats have a uniform height and are tightly packed about the cartridge core, as illustrated for example in FIG. 2a. In the prior art spiral pleated filter cartridge of FIG. 2a, the only void spaces at the cartridge core are the small triangular gaps $G_i$ that are located between adjacent pleat roots.

With continuing reference to FIG. 2b, because of the void spaces created between the pleat roots of the longer pleats in the filter element 12, i.e., the void space $V_i$ between pleat roots $R_a$ and $R_c$ of pleats 14a and 14c respectively, the roots are able to balloon out such that large open gaps $G_e$ are formed between the surfaces $S_e$ of adjacent pleat legs along the entire length of each of the longer pleats. The open gaps within the pleat roots of the longer pleats tend to improve the flow characteristics of the filter cartridge by further reducing the differential pressure drop near the core of the filter. In contrast, in a conventional spiral pleated filter element wherein the pleats are all of equal height and the pleat roots are tightly packed about the core of the cartridge, as shown for example in FIG. 2a, there are no gaps present within the roots of the pleats.

Referring to FIG. 3 in conjunction with FIG. 2, the longer pleats in the filter element 12, e.g., pleats 14a and 14c have a height H that is preferably greater than (D–d)/2, where D is the inner diameter of the cage 30 and d is the outer diameter of the core 20. The shorter pleats in the filter element, e.g., pleat 14b, have a height h that is less than the height of the longer pleats. The shorter pleats can have a height that is less than, equal to or greater than (D–d)/2, so long as the height h of the shorter pleats is less than the height H of the longer pleats. Preferably, the ratio of the shorter pleat heights to the longer pleat heights h/H is about between 50%–95%. By way of example, the pleat height H of the longer pleats may be equal to about 0.830 in. and the pleat height h of the shorter pleats may be equal to about 0.760 in. such that the pleat height ratio is equal to about 92%. It has been determined through experimentation that such a ratio provides optimum flow characteristics in a filter of the type shown in FIGS. 1 and 2.

Figure 5:
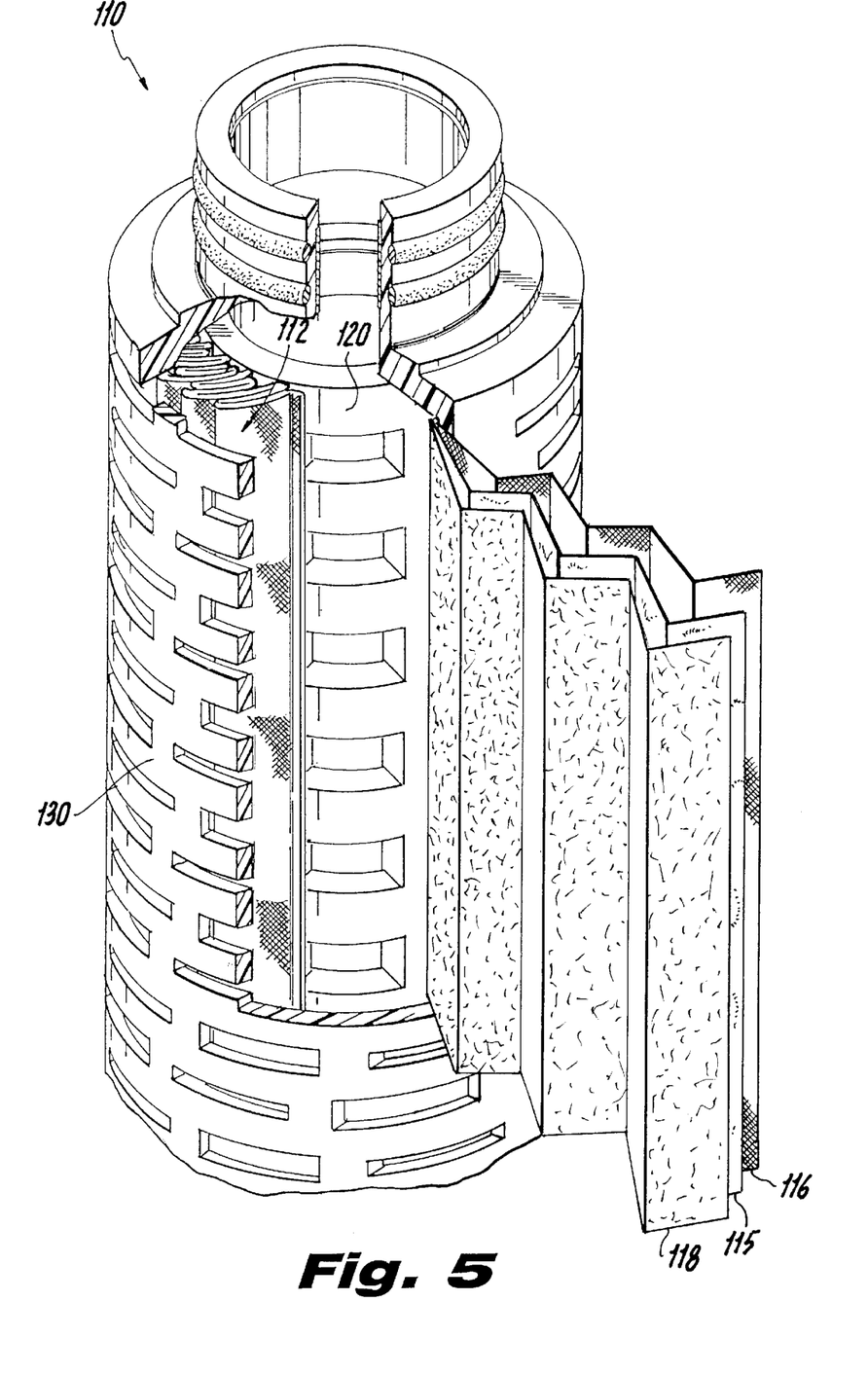
FIG. 5 is a perspective view, in partial cross-section, of another pleated filter cartridge constructed in accordance with a preferred embodiment of the subject invention which includes a stepped spiral pleated filter element surrounding a perforated core and enclosed within a perforated cage.
Figure 6:
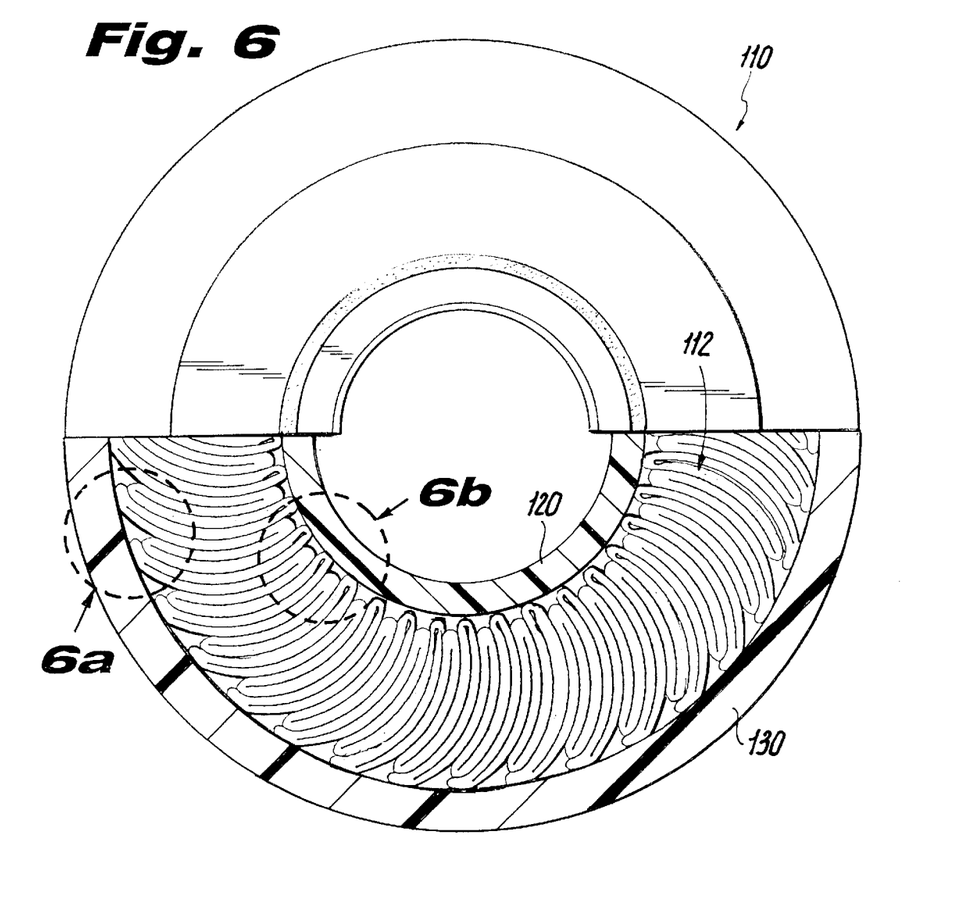
FIG. 6 is a cross-sectional view of the stepped spiral pleated filter cartridge of FIG. 5 illustrating the unique pleat configuration thereof, wherein the pleat heights are staggered about the inner periphery and the outer periphery of the filter element.
Figure 6A:
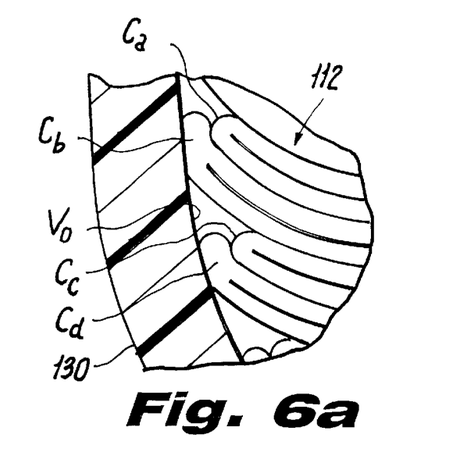
FIG. 6a is an enlarged localized view of the stepped spiral pleated filter cartridge of FIG. 6, illustrating the spaced relationship of adjacent pleat crowns at the cage of the filter cartridge.

Referring now to FIGS. 5 and 6, there is illustrated another preferred embodiment of the pleated filter cartridge of the subject invention which is designated generally by reference numeral 110. Filter cartridge 110 includes a stepped spirally pleated filter element 112 having a plurality of longitudinal pleats 114 surrounding a central perforated core 120 and enclosed within a perforated outer cage 130 having end caps.

Figure 7:
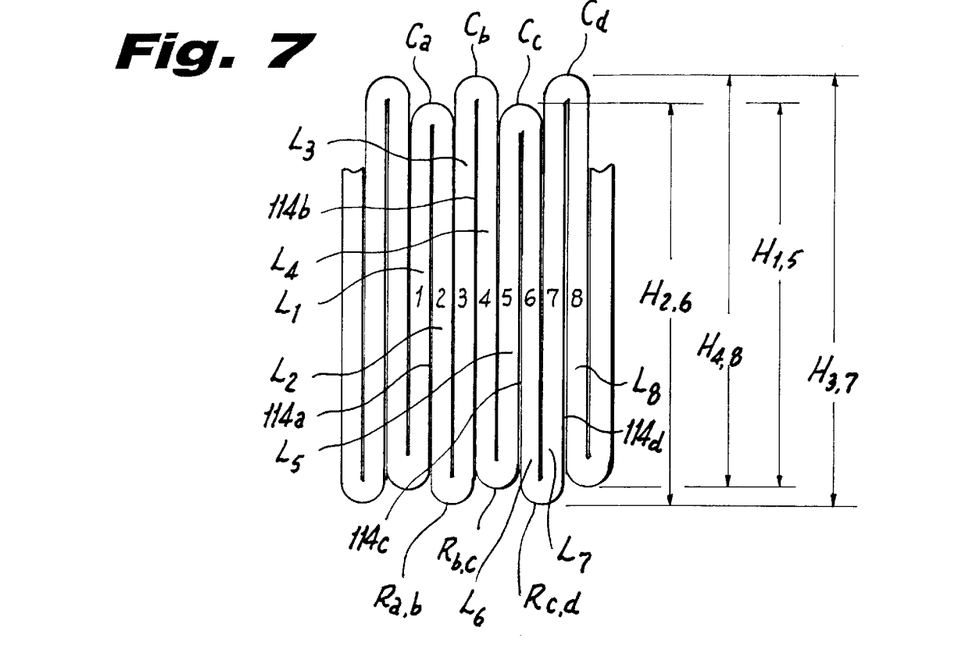
FIG. 7 is a plan view of a portion of a pleat pack used in the formation of the filter cartridge of FIGS. 5 and 6, illustrating the relative heights of the stepped pleat legs.
Figure 8:
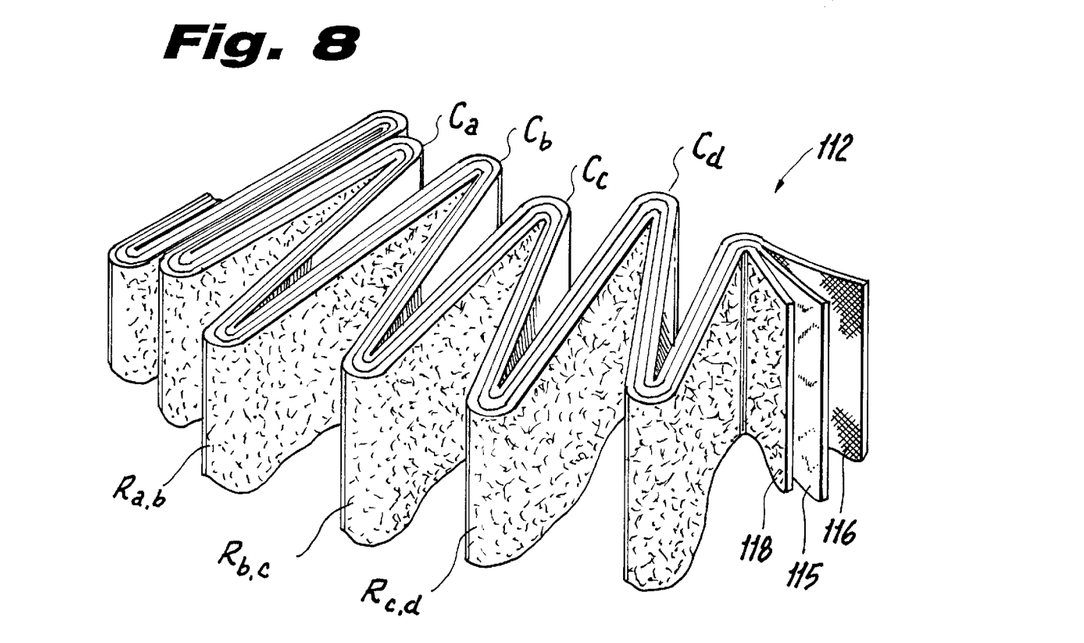
FIG. 8 is a perspective view of a portion of a pleat pack used in the formation of the filter cartridge of FIGS. 5 and 6, illustrating the multi-layer composite structure of the pleat pack, which includes a media layer disposed between a non-woven drainage layer and a mesh drainage layer.

In filter element 112, adjacent pleat legs have different pleat leg heights. More particularly, as illustrated in FIGS. 7 and 8, a first pleat 114a has pleat legs $L_1$ and $L_2$ which are joined to one another at pleat crest $C_a$. A second pleat 114b has pleat legs $L_3$ and $L_4$ which are joined to one another at pleat crest $C_b$. Pleat leg $L_2$ of pleat 114a is joined to pleat leg $L_3$ of pleat 114b at root $R_{a,b}$. A third pleat 114c has pleat legs $L_5$ and $L_6$ which are joined to one another at a pleat crest $C_c$. Pleat leg $L_5$ of pleat 114c is joined to pleat leg $L_4$ of pleat 114b at root $R_{b,c}$. A fourth pleat 114d has pleat legs $L_7$ and $L_8$ which are joined to one another at pleat crest $C_d$. Pleat leg $L_7$ of pleat 114d is joined to pleat leg $L_6$ of pleat 114c at root $R_{c,d}$. This stepped pleat leg pattern is repeated in a uniform manner about the entire filter element 112.

It can be seen that the height of pleat leg $L_1$ is equal to the height of pleat $L_5$, and that pleats legs $L_2$, $L_4$, $L_6$ and $L_8$ are equal in height, while the height of pleat legs $L_3$ is equal to the height of pleat leg $L_7$. The relationship between the pleat leg heights may be expressed in accordance with the expression $H_{1,5} < H_{2,4,6,8} < H_{3,7}$. Preferably, the longest pleat leg height $H_{3,7}$ is greater than (D−d)/2, where D is the inner diameter of the cage 130 and d is the outer diameter of the core 120. Accordingly, the shorter pleat legs in filter element 112, i.e., pleat legs $L_1$, $L_2$, $L_4$, $L_5$, $L_6$ and $L_8$ have pleat leg heights that are less than, equal to or greater than (D−d)/2, so long as the heights of the shorter pleats are less than the height of the longest pleats. By way of example, the longest pleat leg heights $H_{3,7}$ may be equal to about 0.830 in., the intermediate pleat leg heights $H_{2,4,6,8}$ may be equal to about 0.760 in., and the shortest pleat leg heights $H_{1,5}$ may be equal to about 0.680 in., whereby the ratios of pleat leg heights relative to the longest pleat leg height is about 92% for the intermediate pleat legs ($H_{2,4,6,8}/H_{3,7} = 0.92$) and about 82% for the shortest pleat legs ($H_{1,5}/H_{3,7} = 0.82$).

Figure 6B:
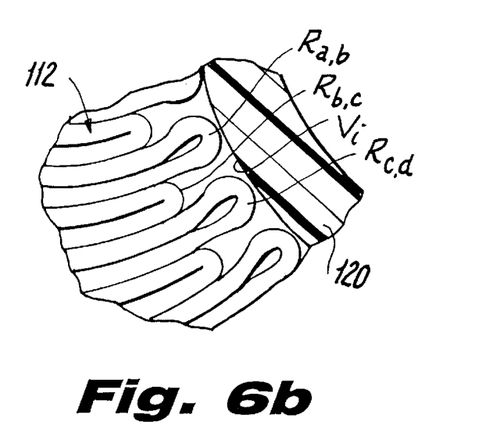
FIG. 6b is an enlarged localized view of the stepped spiral pleated filter cartridge of FIG. 6, illustrating the spaced relationship of adjacent pleat roots at the core of the filter cartridge.

As illustrated in FIG. 6b, pleat roots $R_{a,b}$ and $R_{c,d}$ contact the core 120 of filter cartridge 110 at the inner periphery of filter element 112, while root $R_{b,c}$ is spaced from the core 120 a sufficient radial distance to form a longitudinal channel along the inner periphery of filter element 112 between pleat roots $R_{a,b}$ and $R_{c,d}$. Similarly, pleat crests $C_b$ and $C_d$ contact the cage 130 of filter cartridge 110 at the outer periphery of filter element 112, while pleat crests $C_a$ and $C_c$ are spaced from the cage 130 a sufficient radial distance to form a longitudinal channel along the inner periphery of filter element 112, such as the longitudinal channel formed between pleat crests $C_b$ and $C_d$. As a result, a plurality of longitudinally extending channels are defined along the outer periphery of filter element 112 that enhance radial flow into the filter element through cage 130, and a plurality of longitudinally extending channels are defined along the inner periphery of filter element 112 that enhance drainage from the filter element through the perforated core 120 of the filter cartridge 110.

The spiral pleated filter elements of the subject invention may be formed using a method and apparatus as shown and described in commonly assigned U.S Pat. No. 5,882,288 to Paul et al., the disclosure of which is herein incorporated by reference in its entirety. Alternative spiraling methods known in the art may also be employed.

The spiral pleated filter elements of the subject invention are preferably formed as composite structures that include a filter medium and drainage materials on both the upstream and downstream sides of the filter medium. The type of filter medium can be selected in accordance with the fluid which is to be filtered and the desired filtering characteristics. The filter medium can comprise a porous film or a fibrous sheet or mass. It may have a uniform or graded pore structure and any appropriate effective pore size, and it may be formed from any suitable material, such as a natural or synthetic polymer, glass, or metal. The filter medium may consist of a single layer of material, or a plurality of layers of the same medium disposed atop one another to obtain a desired thickness. It is also envisioned that the filter medium can include two or more layers of media having different filtering characteristics, wherein one layer would serve as a prefilter for the other layer.

The upstream and downstream drainage or support layers of the composite filter element can be made of any material having suitable drainage characteristics. For example, the drainage layers can be in the form of a mesh or screen or a porous woven or non-woven sheet. Meshes and screens come in various forms including metallic meshes that are often used for high temperature filtration applications, and polymeric meshes that are typically used for lower temperature applications. Polymeric meshes come in the form of woven meshes and extruded meshes. Either type may be employed. It is envisioned that the upstream and downstream drainage layers can be made from the same or different material depending upon the filtration application.

By way of example, the spiral w-pleated filter element of FIG. 1 is a multi-layered composite structure that includes at least one filter media layer 15 supported by a non-woven upstream drainage layer 16 and a non-woven downstream drainage layer 18 (see also FIG. 4). Similarly, the stepped spiral pleated filter element of FIG. 5 is a multi-layered composite structure that includes at least one filter media layer 115 supported by a woven mesh upstream drainage layer 116 and a non-woven downstream drainage layer 118 (see also FIG. 8). Alternatively, the upstream drainage layer may be non-woven and the downstream drainage layer may be a woven mesh or netting, depending upon the application.

Tests were preformed to evaluate the differential pressure drop across three different types of 10 in. cartridges having pleated filter elements configured in accordance with the subject invention. In each case, the inventive cartridge had a spiral w-pleat configuration as illustrated in FIG. 2, and was compared to a 10 in. control cartridge having a filter element with a conventional spiral pleat configuration wherein the height of each pleat was the same, as shown for example in FIG. 2a.

In the first case, the inventive filter element and the conventional spiral pleated filter element were constructed using $0.8\mu$ nylon membrane with a non-woven Freudenberg 17 gram mesh as the upstream and downstream support material. In the second case, the inventive filter element and the conventional spiral pleated filter element were constructed using $0.65\mu$ nylon membrane with a non-woven Freudenberg 17 gram mesh as the upstream support and an asymmetric 5 mil Delnet® mesh as the downstream support material. In the third case, the inventive filter element and the conventional spiral pleated filter element were constructed using $0.65\mu$ nylon membrane with a non-woven Typar® T3091L mesh as the upstream support and an asymmetric 5 mil Delnet® mesh as the downstream support material.

The tests were run using water at a temperature of 25° C., and housing losses were subtracted from the differential pressure readings. In each case, data was collected using 4–6 cartridges for each of the three different types of cartridge constructions. This data was averaged and tabulated below.

TABLE 1.0

Membrane Type: 0.80 $\mu$ nylon membrane
Upstream Support Material: Freudenberg 17 gram
Downstream Support Material: Freudenberg 17 gram

| Short Pleat Height (in) | Long Pleat Height (in) | Height Ratio | Area avg. (sq. ft.) | ΔP avg. @ 12 gpm | ΔP avg. @ 16 gpm |
|---|---|---|---|---|---|
| .760 | .830 | 92% | 11.8 | 2.3 | 3.4 |
| .830 | .830 | 100% | 12.4 | 2.8 | 4.0 |

TABLE 2.0

Membrane Type: 0.65 μ nylon membrane
Upstream Support Material: Freudenberg 17 gram
Downstream Support Material: Delnet ® 5 mil

| Short Pleat Height (in) | Long Pleat Height (in) | Height Ratio | Area avg. (sq. ft.) | ΔP avg. @ 12 gpm | ΔP avg. @ 16 gpm |
|---|---|---|---|---|---|
| .760 | .830 | 92% | 11.2 | 1.7 | 2.5 |
| .830 | .830 | 100% | 10.9 | 1.8 | 2.6 |

TABLE 3.0

Membrane Type: 0.65 μ nylon membrane
Upstream Support Material: Typar ® 3091 L
Downstream Support Material: Delnet ® 5 mil

| Short Pleat Height (in) | Long Pleat Height (in) | Height Ratio | Area avg. (sq. ft.) | ΔP avg. @ 12 gpm | ΔP avg. @ 16 gpm |
|---|---|---|---|---|---|
| .760 | .830 | 92% | 11.1 | 1.2 | 1.8 |
| .830 | .830 | 100% | 11.3 | 1.3 | 1.9 |

In sum, in all three cases, the differential pressure drop ΔP across the spiral pleated filter cartridge of the subject invention was less than the differential pressure drop across a conventional spiral pleated filter cartridge using the same materials of construction.

It is envisioned that the pleat patterns of the spiral pleated filter elements disclosed herein and illustrated by way of example in FIGS. 2 and 6 can vary without departing from the spirit or scope of the subject invention. For example, the shortened pleats in filter element 12 can be disposed between adjacent pairs of longer pleats, rather than between adjacent individual pleats as shown and described. In such a case, the pleat height ratio (h/H) would remain the same, but the number of shorter pleats in the filter element would decrease and the overall surface area of the filter element would increase. Nevertheless, a plurality of longitudinal channels would extend along the inner periphery of the filter element, at a uniform frequency, to enhance drainage through the core of the filter cartridge, thereby improving the differential pressure drop across the filter cartridge as compared to prior art spiral pleated filter cartridges.

Although the filter cartridge of the subject invention has been described with respect to preferred embodiments, those skilled in the art will readily appreciate that changes and modifications may be made thereto without departing from the spirit and scope of the present invention as defined by the appended claims.

What is claimed is:

1. A filter comprising:
a cylindrical filter element having a longitudinal axis, an outer periphery and an inner periphery, and including a plurality of longitudinal pleats, each of the pleats having a pair of legs, each of the legs having opposed upstream and downstream pleat surfaces and a height, wherein the height of a first leg of a first pleat is greater than the radial distance between the outer periphery of the filter element and the inner periphery of the filter element, and is also greater than the height of an adjoining leg of an adjacent pleat, and wherein adjacent pleat surfaces of adjoining pleat legs are in mutually supporting contact with one another over the respective heights thereof.

2. A filter as recited in claim 1, wherein the height of the adjoining leg of the adjacent pleat ranges from about fifty percent of the height of the first leg of the first pleat to about ninety-five percent of the height of the first leg of the first pleat.

3. A filter as recited in claim 1, wherein the filter element is a composite having plural layers of material including an upstream drainage layer, at least one interior filtration layer, and a downstream drainage layer.

4. A filter as recited in claim 1, wherein the legs of each pleat are joined at a root, whereby the root of the first pleat is radially spaced from the root of the adjacent pleat.

5. A filter as recited in claim 4, further comprising a perforated cage surrounding the outer periphery of the filter element, and a perforated core surrounded by the inner periphery of the filter element.

6. A filter as recited in claim 5, wherein the root of the first pleat contacts the core and the root of the adjacent pleat is radially spaced from the core.

7. A filter as recited in claim 1, wherein the height of a second leg of the first pleat is equal to the height of the first leg of the first pleat.

8. A filter as recited in claim 1, wherein the height of a second leg of the first pleat is less than the height of the first leg of the first pleat.

9. A filter as recited in claim 1, wherein the legs of the adjacent pleat are equal in height.

10. A filter as recited in claim 1, wherein the height of a second leg of the adjacent pleat is greater than the height of the adjoining leg of the adjacent pleat.

11. A filter comprising:
a cylindrical filter element having a longitudinal axis, an outer periphery and an inner periphery, and including a plurality of longitudinal pleats arranged in a spiral configuration, each of the pleats having a pair of legs, each leg having opposed upstream and downstream pleat surfaces, the legs of each pleat joined to one another at a root, wherein the roots of adjacent pleats are radially spaced from one another at a uniform frequency about the inner periphery of the filter element, and wherein adjacent pleat surfaces of adjoining pleat legs are in mutually supporting contact with one another over the respective heights thereof.

12. A filter as recited in claim 11, wherein the filter element is a composite having plural layers of material including an upstream drainage layer, at least one interior filtration layer, and a downstream drainage layer.

13. A filter as recited in claim 11, further comprising a perforated cage surrounding the outer periphery of the filter element, and a perforated core surrounded by the inner periphery of the filter element.

14. A filter as recited in claim 11, wherein adjoining legs of adjacent pleats are connected to one another at a pleat crest, and wherein the adjacent pleat crests are radially spaced from one another at a uniform frequency about the outer periphery of the filter element.

15. A filter cartridge comprising:
a) a cylindrical filter element having a longitudinal axis, an outer periphery and an inner periphery, and including a plurality of longitudinal pleats arranged in a spiral configuration, each of the pleats having a pair of legs, each leg having opposed upstream and downstream pleat surfaces, the legs of each pleat joined to one another at a root, wherein adjacent pleat surfaces of adjoining pleat legs are in mutually supporting contact with one another over the respective heights thereof;
b) a perforated cage surrounding the outer periphery of the filter element;
c) a perforated core surrounded by the inner periphery of the filter element wherein the roots of adjacent pleats are radially spaced from one another relative to the perforated core; and d) at least one end cap enclosing the perforated cage.

16. A filter as recited in claim 15, wherein the filter element is a composite having plural layers of material including an upstream drainage layer, at least one interior filtration layer, and a downstream drainage layer.

17. A filter as recited in claim 15, wherein adjoining legs of adjacent pleats are connected to one another at a pleat crest, and wherein the crests of adjacent pleats are radially spaced from one another relative to the perforated cage.

18. A filter comprising:

a cylindrical filter element having a longitudinal axis and including a plurality of longitudinally extending pleats arranged in a spiral configuration about the axis of the filter element, each of the pleats having a pair of legs, each leg having opposed upstream and downstream pleat surfaces, each pleat having a radial height, wherein adjacent pleats in the filter element have a relative radial height ratio of about between 50% and 95%, and wherein adjacent pleat surfaces of adjoining pleat legs are in mutually supporting contact with one another over the respective heights thereof.

19. A filter as recited in claim 18, wherein the relative radial height ratio of adjacent pleats in the filter element is about 92%.

20. A filter as recited in claim 19, wherein the height of one pleat in the filter element is about 0.830 inches and the height of an adjacent pleat in the filter element is about 0.760 inches.

21. A filter as recited in claim 18, further comprising a perforated cage surrounding an outer periphery of the filter element.

22. A filter as recited in claim 18, further comprising a perforated core surrounded by an inner periphery of the filter element.

23. A filter as recited in claim 18, wherein the filter element is a composite having plural layers of material including an upstream drainage layer, at least one interior filtration layer, and a downstream drainage layer.

24. A filter as recited in claim 18, wherein the legs of each pleat are joined to one another at a root, and wherein the roots of adjacent pleats are radially spaced from one another at a uniform frequency about the inner periphery of the filter element.

25. A filter comprising:

a cylindrical filter element having a longitudinal axis, an outer periphery and an inner periphery, and including a plurality of longitudinal pleats arranged in a spiral configuration in close proximity to one another, each of the pleats having a pair of legs, the legs of adjoining pleats joined to one another at a pleat crest, wherein adjacent pleat crests are radially spaced from one another at a uniform frequency about the outer periphery of the filter element.

26. A filter as recited in claim 25, wherein the legs of each pleat are joined to one another at a root, and wherein the roots of adjacent pleats are radially spaced from one another at a uniform frequency about the inner periphery of the filter element.

27. A filter as recited in claim 25, further comprising a perforated cage surrounding an outer periphery of the filter element.

28. A filter as recited in claim 25, further comprising a perforated core surrounded by an inner periphery of the filter element.

29. A filter as recited in claim 25, wherein the filter element is a composite having plural layers of material including an upstream drainage layer, at least one interior filtration layer, and a downstream drainage layer.

* * * * *